Dec. 17, 1957 L. J. GIACOLETTO 2,816,964

STABILIZING MEANS FOR SEMI-CONDUCTOR CIRCUITS

Filed Oct. 27, 1954

INVENTOR.
LAWRENCE J. GIACOLETTO

BY H. L. Newton

ATTORNEY 2,816,964
Patented Dec. 17, 1957

1

2,816,964

STABILIZING MEANS FOR SEMI-CONDUCTOR CIRCUITS

Lawrence J. Giacoletto, Princeton Junction, N. J., assignor to Radio Corporation of America, a corporation of Delaware Application October 27, 1954, Serial No. 464,985

5 Claims. (Cl. 179—171)

This invention relates in general to amplifying and other electrical circuits utilizing semi-conductor devices, and in particular to means for providing stable operation of such circuits.

For many circuit applications involving semi-conductor devices such as transistors, it is desirable to keep the direct current emitter current of the transistor substantially constant. Thus, variations of the emitter current may affect the operation of a transistor to a considerable extent, resulting in unstable and inefficient circuit operation. The emitter current of a transistor may be varied considerably, moreover, by such factors as variations in the ambient temperature, particularly at elevated temperatures, or by changes in the circuit parameters. These variations are undesirable for many circuit applications and occur quite readily with small changes in the circuit and its environment, and it is, accordingly, a principal object of the present invention to provide means for stabilizing the emitter current of a semi-conductor device, such as a transistor, in any operating circuit.

It is another object of the present invention to provide means, in any operating circuit, for maintaining the emitter current of a transistor used therein substantially constant whereby stable and efficient circuit operation are achieved.

It is a still further object of the present invention to provide signal translating circuits utilizing a transistor as an active signal translating element wherein circuit means are provided for maintaining the direct current emitter current of the transistor substantially constant and providing stable and efficient circuit operation.

These and further objects and advantages of the present invention are achieved, in general, by using a transistor direct current amplifier to compare the potential drop across an impedance element in the emitter circuit of the transistor to be stabilized, with the emitter energizing voltage of the auxiliary transistor direct current amplifier. In one aspect, a standard battery is connected in series with the emitter of the auxiliary transistor. In another aspect, a voltage dividing network is connected with the emitter of the auxiliary transistor. In either case, the emitter current of the stabilized transistor is maintained at a substantially constant value irrespective of circuit or environment changes such as variations in the ambient temperature.

Figure 1:
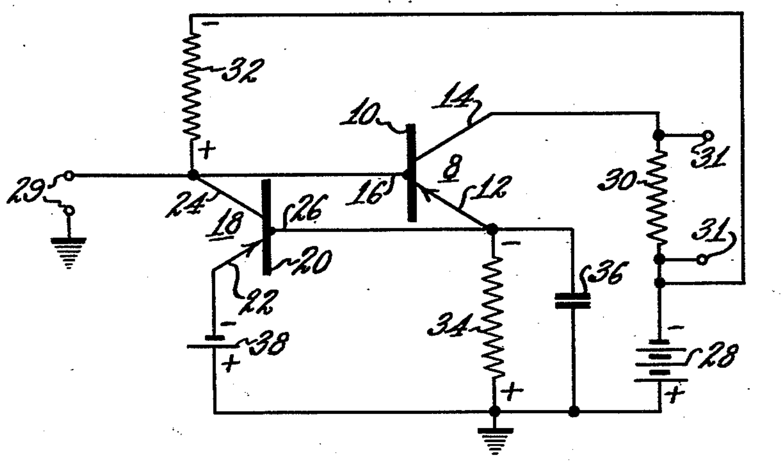
Figure 2:
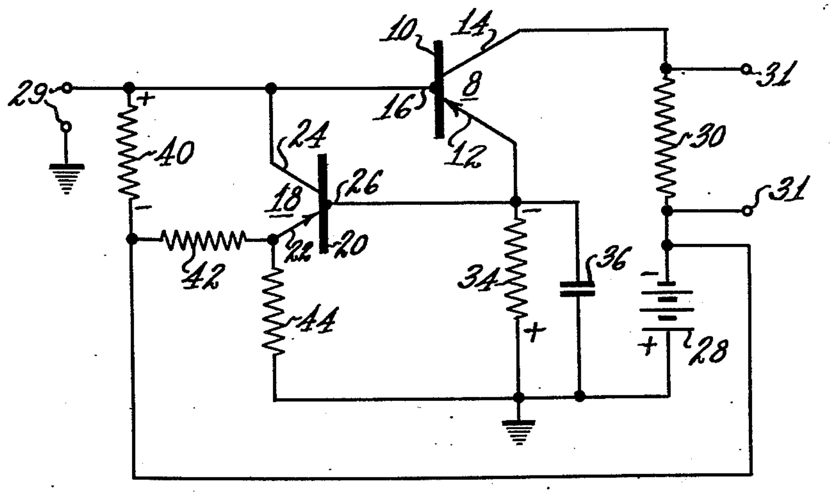

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1 and 2 are schematic circuit diagrams of amplifying circuits each employing a pair of transistors in accordance with the present invention.

Referring now to the drawing, wherein like parts are indicated by like reference numerals in both figures, and

2 referring particularly to Figure 1, a circuit embodying the invention comprises a first transistor 8, the emitter current of which it is desired to stabilize, and a second or auxiliary transistor 18 which is used as a direct current amplifier to provide the desired emitter current stabilization. Each of the transistors comprises a semi-conductive body with which three electrodes are cooperatively associated in a well known manner. Thus, the transistor 8 comprises a semi-conductive body 10 and an emitter 12, a collector 14 and a base 16. Similarly, the transistor 18 comprises a semi-conductive body 20 and an emitter 22, a collector 24 and a base 26. The transistors 8 and 18 are of the same conductivity type and may be considered to be junction transistors of the P-N-P type, although it should be understood that other type semi-conductor devices having three or more electrodes and semi-conductor devices of an opposite conductivity type could be used.

To provide collector biasing potential for both transistors, a battery 28 is provided, the positive terminal of which is connected to a point of fixed reference potential or ground for the system as shown. The negative terminal of the battery 28 is connected through a load impedance means such as illustrated by a resistor 30 to the collector 14 of the stabilized transistor 8. The negative terminal of the battery 28 is also connected through a resistor 32 to the collector 24 of the auxiliary transistor 18 and also to the base 16 of the stabilized transistor 8. Thus, the resistor 32 is seen to be connected in common with the base 16 and the collector 24.

The emitter 12 of the stabilized transistor 8 is connected to ground through a voltage dropping resistor 34. To by-pass unwanted signal currents to ground, a capacitor 36 is connected in shunt with the resistor 34 to ground as shown. In accordance with the invention, the junction point of the emitter 12 and the resistor 34 is connected to the base 26 of the stabilizing transistor 18. Thus, the resistor 34 is seen to be connected in common with the emitter 12 and the base 26.

To provide a source of standard potential which the auxiliary transistor 18 can compare with the potential drop across the resistor 34, in accordance with the invention, energization means are connected with the emitter 22 of the stabilizing or auxiliary transistor 18. To this end, in the embodiment of the invention illustrated in Figure 1, a battery 38, which is poled so as to apply a reverse biasing voltage to the emitter electrode 22, has its positive terminal grounded and its negative terminal connected directly with the emitter 22. While the battery 38 is poled in a direction to apply reverse bias to the emitter 22, in operation the voltage on the emitter 22 is in the forward direction relative to the base 26. That is, the emitter voltage will be positive relative to the base voltage during the circuit operation. It should be understood that rather than a separate emitter biasing battery, the negative potential for the emitter 22 could be obained from the battery 28.

The transistor 8 may be used as a signal amplifier, for example, and to this end a pair of input terminals 29 may be provided, one of which is grounded and the other of which is connected directly with the base 16 of the transistor 8. Output energy may be taken from across the load resistor 30. Accordingly, a pair of output terminals 31 may be provided which are connected to either end of the resistor 30.

In operation, it will be assumed that a change in temperature or other environmental changes have caused the direct current emitter current of transistor 8 to increase. This current flows into the semi-conductive body 10 and causes a potential drop across the resistor 34 with the polarity as shown. Accordingly, as the emitter current of the transistor 8 increases, the base 26 of the auxiliary or stabilizing transistor 18 becomes more negative. Thus, the collector current of the transistor 18 will increase.

The collector current of the transistor 18 flows out of the semi-conductive body 20 and will flow through the resistor 32, resulting in a potential drop across this resistor with the polarity shown. Accordingly, the base 16 of the transistor 8 will become less negative. By making the base 16 of the transistor 8 less negative, its emitter current will be reduced. Accordingly, by proper choice of the circuit parameters and operating points of the transistors, the emitter current of the transistor 8 can be held substantially constant. It will also be seen that if the emitter current of the transistor 8 decreases, the collector current of the transistor 18 will also decrease, thus tending to make the base 16 more negative, which will tend to increase the emitter current of the transistor 8.

If N-P-N junction transistors are utilized, for example, the polarity of the batteries 28 and 38 would have to be reversed and the polarity of the various voltages in the circuit would also be reversed. The circuit operation would otherwise be identical to that described above.

Rather than comparing the voltage drop across the emitter resistor 34 with a standard battery in the emitter circuit of the stabilizing resistor, the comparison could be made with the voltage across a voltage dividing network in the emitter circuit of the stabilizing transistor. To this end, in Figure 2 a voltage dividing network comprising the resistors 42 and 44 is connected with the emitter 22 of the stabilizing transistor 18. The resistor 42 is connected serially between the emitter 22 and the negative terminal of the biasing battery 28, while the resistor 44 is connected in series between the emitter 22 and ground. A resistor 40 is also connected between the negative terminal of the biasing battery and the collector 24 of the stabilizing transistor 18 and the base 16 of the stabilized transistor 8. Accordingly, the resistor 40 may be referred to as being connected in common with the collector 24 and the base 16. In other respects, it will be evident that the circuit arrangement is identical to the one illustrated in Figure 1, the biasing arrangement and the resistance of resistors 42 and 44 being chosen such that the emitter 22 will be biased in the conducting direction with respect to the base 26 during the circuit operation.

In operation, if the emitter current of the transistor 8 is increased, the potential drop across the emitter resistor 34 will cause the base 26 of the stabilizing transistor 18 to become more negative. Thus, the collector current of transistor 18 will tend to increase. The collector current of the transistor 18 will flow through the resistor 40 and causes the base 16 of the transistor 8 to become less negative, thus reducing the emitter current of transistor 8. Accordingly, in this embodiment of the invention, as in Figure 1, the emitter current of the transistor 8 is maintained substantially constant despite circuit or environment changes which would normally tend to increase or decrease the emitter current.

As described herein, by utilizing an auxiliary direct current amplifier transistor in conjunction with another transistor, the latter transistor's emitter current may be held substantially constant despite changes in the circuit parameters or environment changes, such as changes in the ambient temperature. Thus, stable and efficient circuit operation will be achieved. Accordingly, the invention described herein may be useful wherever circuit or environmental conditions are such that the emitter current of a transistor tends to vary and such variations are undesirable.

What is claimed is:

1. In an electrical circuit including a first semi-conductor device including a first base, a first emitter and a first collector electrode, means for applying an input signal to said first base electrode, means for deriving an output signal from said first collector electrode, stabilizing means providing a substantially constant emitter current for said first semi-conductor device comprising, in combination, a second semi-conductor device including a second base, a second emitter and a second collector electrode, means providing a point of fixed reference potential for said circuit, means including a source of potential and a first resistor serially connected with said second emitter electrode and providing biasing potentials in the non-conducting direction therefor, a second resistor serially connected between said first emitter electrode and said point of reference potential, conductive circuit means connecting said first emitter electrode with said second base electrode, a third resistor serially connected between said second emitter electrode and said point of reference potential, said first and third resistors comprising a voltage dividing network for said second device, means connecting said second collector electrode with said first base electrode, and a fourth resistor connected between said last named means and said source of potential.

2. In an electrical circuit including a first transistor having at least a first base, a first emitter and a first collector electrode, signal input means connected for applying an input signal to said first base, and signal output means connected for deriving an output signal from said first collector, stabilizing means providing a substantially constant emitter current for said first transistor comprising, in combination, a second transistor having a second base, a second emitter and a second collector electrode, means connected for applying biasing operating voltages to said first collector and said second emitter including a source of potential having a pair of terminals one of which is connected to a point of reference potential, said second emitter being initially biased in the reverse relatively non-conducting direction, a first resistor connected between said first emitter and said point of reference potential and providing a voltage variation in response to current variation of said first transistor, direct current conductive means connecting said first emitter with said second base to vary the current conducting condition of said second transistor in response to voltage variations across said first resistor, a second resistor connected between said second collector and the other terminal of said source of potential and providing a voltage variation in response to current variations of said second transistor, and direct-current conductive means connecting said second collector with said first base to apply the voltage variations across said second resistor to said first base to stabilize the circuit operation of said first transistor.

3. In an electrical circuit including a first transistor having a first base, a first emitter and a first collector electrode, signal input means connected for applying an input signal to said first base, and signal output means connected for deriving an output signal from said first collector, stabilizing means providing a substantially constant emitter current for said first transistor comprising, in combination, a second transistor having a second base, a second emitter and a second collector electrode, means including a first source of potential connected between said second emitter and a point of reference potential in said circuit and providing biasing potentials in the non-conducting direction therefor, a second source of potential connected between said first collector and said point of reference potential for biasing said first transistor for signal amplifying operation, a first resistor serially connected between said first emitter and said point of reference potential, conductive circuit means connecting said first emitter with said second base whereby potential variations across said first resistor due to emitter current variations of said first transistor are applied to said second base electrode, a second resistor connected between said second collector and the junction of said first collector and said second source of potential and providing potential variations in response to variations in the collector current flow of said second transistor, and direct-current conductive means connecting said second collector with said first base to apply potential variations across said second resistor to said first base to stabilize the circuit operation of said first transistor.

4. The combination with a first transistor including a first base, a first emitter, and a first collector electrode, a signal input circuit connected with said base, and a signal output circuit connected for deriving an output signal from said collector, of a second transistor including a second base, a second emitter, and a second collector electrode, means providing biasing potentials for said transistor including at least a pair of terminals of opposite polarity, means connecting said first collector and second emitter with one of said terminals and providing reverse bias therefor, first voltage dropping impedance means connecting said first emitter with the other of said terminals and providing voltage variations in response to emitter current variations of said first transistor, means connecting said first emitter with said second base to apply said voltage variations thereto and to increase the current flow of said second transistor in response to an increase in emitter current of said first transistor, second voltage dropping impedance means connected between said second collector and said one terminal and providing voltage variations in response to collector current variations of said second transistor, and means connecting said second collector with said first base to reduce the emitter current flow and stabilize the circuit operation of said first transistor in response to an increase in collector current of said second transistor.

5. The combination with a first transistor including a first base, a first emitter, and a first collector electrode, a signal input circuit connected with said base electrode, and a signal output circuit connected with said collector, of a second transistor including a second base, a second emitter, and a second collector electrode, means providing biasing potentials for said transistors including at least a pair of terminals of opposite polarity, means connecting said first collector with one of said terminals, a first resistor connecting said first emitter with the other of said terminals and providing voltage variations in response to emitter current variations of said first transistor, means providing a voltage dividing network including a second resistor connecting said second emitter with said other terminal and a third resistor connecting said second emitter with said one terminal, said means providing biasing potentials being poled in said circuit to apply reverse bias to said second emitter, means connecting said first emitter with said second base to apply voltage variations across said first resistor to said second base to vary the current conducting condition of said second transistor, a fourth resistor connecting said second collector with said one terminal and providing voltage variations in response to collector current variations of said second transistor, and means connecting said second collector with said first base to apply voltage variations across said fourth resistor to said first base to vary the emitter current and stabilize the circuit operation of said first transistor.

References Cited in the file of this patent

UNITED STATES PATENTS 2,663,806 Darlington -------------- Dec. 22, 1953

OTHER REFERENCES

Chase et al. article, "Bell System Tech., Journal," July 1954, pages 827–858.